United States Patent [19]

Frankenfeld et al.

[11] 3,773,518
[45] Nov. 20, 1973

[54] RAW GRAIN AND FEED COMPOSITIONS CONTAINING 1,3-ALIPHATIC DIOLS AND/OR THEIR ESTERS

[76] Inventors: John W. Frankenfeld, 2 Ballinswood Rd., Atlantic Highlands, N.J. 07716; Raam R. Mohan, 112 Oakland St., Berkeley Heights; Robert L. Squibb, 1172 Kearney Dr., North Brunswick, both of N.J.

[22] Filed: Jan. 27, 1971

[21] Appl. No.: 110,247

[52] U.S. Cl. .................. 426/151, 426/208, 426/210
[51] Int. Cl. ......................... A23k 3/02, A23b 9/00
[58] Field of Search ....................... 99/8, 17, 150 R, 99/153, 83, 90 P, 2 R

[56] References Cited
UNITED STATES PATENTS

| | | | |
|---|---|---|---|
| 1,802,083 | 4/1931 | Legendre | 99/153 |
| 2,437,150 | 3/1948 | Berg | 99/83 |
| 2,651,572 | 9/1953 | Bickoff | 99/8 |
| 3,145,109 | 8/1964 | Howard | 99/123 X |
| 3,373,044 | 3/1968 | Thompson et al. | 99/123 X |
| 3,479,189 | 11/1969 | Vrang et al. | 99/91 X |
| 3,485,639 | 12/1969 | Knightly | 99/150 X |
| 3,667,964 | 6/1972 | Frankenfeld et al. | 99/150 X |
| 3,667,965 | 6/1972 | Frankenfeld et al. | 99/150 X |

*Primary Examiner*—Norman Yudkoff
*Assistant Examiner*—Kenneth P. Van Wyck
*Attorney*—Manahan and Wohlers and W. O. Heilman

[57] ABSTRACT

Raw grain and feed compositions of great resistance to the attack of molds, bacteria and yeast are prepared by utilizing with said substances an aliphatic 1,3-diol and/or their esters.

11 Claims, No Drawings

RAW GRAIN AND FEED COMPOSITIONS CONTAINING 1,3-ALIPHATIC DIOLS AND/OR THEIR ESTERS

The present invention is concerned with raw grain and feed compositions which are stable in storage and during shipment against the attack of molds, yeasts and bacteria. This stability and resistance to attack is secured by utilizing in conjunction with these materials a relatively small amount of a 1,3-aliphatic diol and/or their mono- or diesters.

A very great problem in the storage and transportation of raw grains and food compositions is that they are subject to attack of various fungi, molds, yeasts and bacteria which, in many instances, render these food materials poisonous both to animals and to humans. Large quantities of grain are grown to feed all classes of livestock, and microbiological deterioration of the food products in storage is a very serious problem. The molds and bacteria which can develop in stored grain not only consume its more valuable nutritive components but as heretofore mentioned are also a hazard to the health of both humans and animals.

Various techniques had been developed in order to at least partially solve this problem. One technique is to reduce the moisture content, for example below about 14 percent. Another technique is to use an additive such as propionic acid. Other techniques are to restrict the growth of the microorganism by depriving them of oxygen or by chilling. Particularly undesirable and harmful microorganisms are, for example, *Bacillus mesentericus, Aspergillus, Penicillium* and *Salmonella montevideo*. These microorganisms particularly attack the grains such as wheat, rice, oats, rye, beans, maize and hay. Many of these microorganisms produce mycotoxins which are harmful to humans and animals. A particularly dangerous mycotoxin producer is *Aspergillus flavus*.

Thus, the present invention is broadly concerned with the control of microorganisms which attack grains and other forage crops. Some of the microorganisms among many others which attack grain and related substances are as follows:

| | |
|---|---|
| Achromobacter spec. | Monilia spec. |
| *Alternaria flavus* | Mucor |
| *Aspergillus flavus* | Oospora |
| *Aspergillus fumigatus* | *Penicillium digitatum* |
| *Aspergillus niger* | *Penicillium glaucum* |
| Bacterium coli | *Penicillium notatum* |
| Bacterium fluorescens | *Pezisella lythri* |
| *Botrytis allii* | *Pseudomonas aeruginosa* |
| *Botrytis cinerea* | *Pseudomonas nonliquefaciens* |
| *Brettenomyces versalis* | *Pullularia pullulans* |
| Candida albicans | *Rhizopul nigricans* |
| Candida krusei | *Rhodotorula spec* |
| Cladosporium spec | Salmonella |
| Colletotrichum phomides | *Saccharomyces cerevisiae* |
| *Debaryomyces menbranaefaciens* var. *Hollondicus* | *Saccharomyces ellipsoideus* |
| | *Sporendomema epizoum* |
| Dendrophoma obscurans | *Streptobacterium platarum lipolytica* |
| Endomycapsis ohmeri | |
| Flavobacterium fucatum | *Torulopsis caroliniana* |
| Fusarium | *Torulopsis homii* |
| Hansenula subpelliculosa | *Trichosporon variable* |
| Hormodendrom spec | *Willia anomala* |
| Micrococcus pikowski | *Zygosaccharomyces halomenbranis* |

Thus, the present invention is concerned with feed compositions, raw grain compositions and the like which contain intimately mixed therewith a relatively small amount of a 1,3-aliphatic diol and/or their mono- or diesters. The grain granules are, in effect, coated with a fine film of the diol or diol ester which may be applied by any suitable technique such as by mass mixing or by spraying.

The amount of diol or diol ester utilized is in the range from about 0.05 to 2.0 percent by weight, preferably in the range from about 0.1 to 0.5 percent by weight based upon the weight of the material being preserved against attack.

The 1,3-diol contains from about six to 15 carbon atoms in the diol chain, preferably from seven to nine carbon atoms in the diol chain. Very desirable diols for utilization in the present invention are 1,3-heptanediol, 1,3-octanediol and 1,3-nonanediol. If a mono- or diester be utilized, the number of carbon atoms in the diol chain is in the range from about three to 15, preferably in the range from four to 10. The number of carbon atoms in the ester group may vary in the range from about two to 15, preferably from about three to 10. Particularly desirable diol esters are 1,3-octanediol-1-monopropionate and 1,3-butanediol-1-monooctanoate.

The particular preferred diols of the present invention are 1,3-diols and correspond to the following chemical formulas:

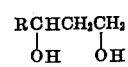

where R represents an n-alkyl group containing three to 12 carbon atoms. Thus, the preferred 1,3-diols must contain a minimum of six carbon atoms in the chain (R = 3). Diols with fewer carbon atoms are not as effective preservatives. The preferred diols contain from seven to nine carbon atoms in the chain (R = 4 to 6).

The preferred monoesters of the present invention correspond to the following chemical formulas:

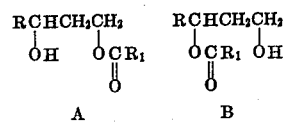

where R = an n-alkyl chain of zero to 12 carbon atoms and $R_1$ is an n-alkyl chain containing from one to 17 carbon atoms. Thus, the esters may contain from three to 15 carbon atoms in the diol portion of the molecule. The preferred monoesters are those which contain four to 10 carbon atoms in the diol portion (R = 1 to 7) of the molecule and from three to 10 carbon atoms ($R_1$ = 2 to 9) in the ester portion of the molecule. Very desirable monoesters are 1,3-butanediol-1-monooctanoate and 1,3-octanediol-1-monopropionate. These monoesters may exist in two different forms. Form A is the 1-monoester form. Form B is the 3-monoester form.

Still another ester form which is useful for certain applications is the diester C.

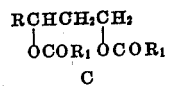

where R = an n-alkyl chain of zero to 12 carbon atoms and $R_1$ is an n-alkyl chain of one to 17 carbon atoms. The preferred diesters contain from about four to eight carbon atoms in he diol portion (R = 1 to 5) and from three to 10 carbon atoms ($R_1$ = 2 to 9) in the ester portions of the molecule. Although the diesters are generally not as active as the monoesters, they are useful in cases where their physical properties (e.g., their increased lipophilic character) are especially desirable.

It is essential, for both the 1,3-diols and their esters that the molecules be linear and that the hydroxy and-/or carbalkoxy (ester) groups be attached to the first and third carbon atoms. It is this 1,3-difunctionality which renders these compounds especially useful because of their inherent safety for use around humans and animals.

Other suitable diols for use in the present invention are 1,3-hexanediol, 1,3-decanediol and 1,3-undecanediol.

The diol and diol esters of the present invention may be prepared by any suitable technique such as by the Reformatsky reaction followed by reduction, or by means of the Prins reaction of formaldehyde and the appropriate olefin.

In order to further illustrate the invention, various tests were carried out, the results of which are described in the following examples and tables of data. In Table I are summarized the results of toxicity measurements and nutritional evaluations for a variety of dihydroxy compounds including the 1,3-diols. These studies were conduced with rats.

The "observed metabolic energy" values shown in Table I were obtained by feeding test groups, of five–10 rats each, various amounts of several high energy supplements including the 1,3-diols. The basal diets in each case contained sufficient protein, salts, vitamins and minerals to support normal growth. However, the basal diets were deficient in energy (calories). This deficit was, in part, overcome by adding varying amounts of the polyols or of natural energy sources of known caloric densities such as lard, sucrose, or glucose. Curves were drawn by plotting the average change in body weight of test animals against the amount of high energy supplement tested and straight lines were obtained. The slopes of the lines are measures of the energy values of the test compounds. The values given in Table I were obtained by measuring the slopes of the lines of the test compounds and comparing them with the slopes of the lines obtained with the standards (lard, glucose or sucrose whose caloric densities are 9.3 Kcal/g, 3.8 Kcal/g and 4.1 Kcal/g, respectively). The "observed metabolic energy" values were calculated according to the formula:

$$\text{Kcal/g of unknown} = \frac{\text{Slope of unknown line}}{\text{Slope of standard line}} \times \text{Kcal/g of standard}$$

The "observed metabolic energy" of a material is a measure of its nutritional value. The higher the energy the greater its value. It is clear from the results given in Table I that 1,3-diols are very desirable components from a safety standpoint. Compounds which do not posses the 1,3-dihydroxy structure are toxic and, therefore, not useful preservatives where contact with humans or animals is likely.

$LD_{50}$ values are a common measure of the toxicity of a compound. These $LD_{50}$ values represent the lethal dose for a 50 percent kill of the animals tested per unit weight of the animals. The higher the $LD_{50}$ value, the lower the toxicity. The data in Table I establish that the 1,3-configurations of polyalcohols are the least toxic. The $LD_{50}$ values are significantly higher in compounds possessing this structural feature. The $LD_{50}$ values

TABLE I.—NUTRITIONAL AND TOXICITY DATA FOR VARIOUS DIOLS

| Compound | Dihydroxy compound | Oral $LD_{50}$ (7 days) g./kg.[1,2] | Observed metabolic energy (Kcal./g.) | Percent utilized [3] |
|---|---|---|---|---|
| 1 | 1,3-butanediol | 29 | 6.0 | 88 |
| 2 | 1,3-pentanediol | >20 | 7.8 | 100 |
| 3 | 1,5-pentanediol | 2 | [4] NU | |
| 4 | 1,3-hexanediol | >20 | 6.6 | 85 |
| 5 | 1,5-hexanediol | >20 | [4] NU | |
| 6 | 2,5-hexanediol | 2 | [4] NU | |
| 7 | 1,6-hexanediol | 5 | [4] NU | |
| 8 | 1,3-heptanediol | >20 | 8.0 | 98 |
| 9 | 1,3-octanediol | >20 | 5.8 | 71 |
| 10 | 1,3-nonanediol | >20 | 7.5 | 85 |
| 11 | 1,3-decanediol | >20 | | |
| 12 | 1,3-undecanediol | >20 | | |

[1] Single dose in rats.
[2] $LD_{50}$=lethal dose for 50% kill.
[3] Determined by dividing observed metabolic energy (Kcal.) by theoretical metabolic energy (Kcal.).
[4] NU=Not Utilized.

given in Table I were obtained by giving test animals graded single doses of the test compounds orally and observing them for one week. The number of deaths in each group was noted and the dose required for a 50 percent kill taken as the $LD_{50}$ value. In many cases, no death occurred even at the 20 g/kg level (about as much as one can give a rat in one dose), hence the basis of the ">20" values shown in the table.

The toxicity data with respect to the esters are given in the following Table II. The $LD_{50}$ values for some common food and feed preservatives are also shown. All are significantly more toxic (lower $LD_{50}$ values) than either the diols or the esters.

Table II

TOXICITY DATA

| Preservative | Oral $LD_{50}$ (Rats)[1] |
|---|---|
| Diol esters (propionates and higher) | >20 g/Kg |
| Sorbic acid[2] | 10 g/Kg |
| Sodium sorbate[2] | 6–7 g/Kg |
| Propionic acid[3] | 4 g/Kg |
| Sodium benzoate[2] | 2–3 g/Kg |

[1] $LD_{50}$=lethal dose for 50% kill.
[2] Source: Handbook of Toxicology, Vol. I, W.S. Spector, ed., WADC Tech. Rept. No. 55-46, National Academy of Sciences, National Research Council (1955).
[3] Source: H.F. Smyth et al., Am. Ind. Hyg. Assoc. J., 23, 95 (1962)

In order to further illustrate this invention and, in particular, to establish the superiority of the 1,3-diols and esters as bacteriostats and mold inhibitors, the following microbiological tests were conducted.

EXAMPLE 1

Nutrient broth was used as the basal nutrient medium for the growth of all microorganisms tested. Five ml. of nutrient broth medium (Difco Co.) were placed in 18 mm × 150 mm test tubes and the basal medium sterilized with steam at 15 psi for 15 minutes. After cooling, a sufficient amount of the various compounds were added to the basal medium to give the concentrations used. Normally a final concentration of 0.2, 1 and 2 percent were used.

After mixing the chemicals with nutrient broth, the tubes were inoculated with the various test microorganisms. The test microorganisms were grown 25 hours earlier in nutrient broth and 1 drop of the dense microbial suspension was added to the tubes.

The tubes containing the chemicals and microorganisms were then incubated at the optimal growth temperature reported for each microorganism tested. Either 37° C. or 30° C. was used. Growth in control tubes, as well as those containing chemicals, was observed visually. After a suitable incubation period, a small aliquot of the test solutions was streaked on an agar plate.

This was done in order to confirm the visual readings of the presence of microbial growth.

The results are shown in Table III and IV. The "minimum effective concentration" is the lowest concentration of additive which effectively prevented growth under the conditions of the test.

It is apparent from the above that the effectiveness of these materials against a wide spectrum of bacteria is established by the typical data shown in Table III. In these tests the test compounds are compared to the known commercial preservatives, potassium sorbate and calcium propionate, as to their ability to inhibit growth of various bacteria. It is apparent that several of the compounds are effective at lower concentrations than either of the current additives. Of especial interest is the result that some of the test compounds are active against *Salmonella* at levels as low as 0.2 percent. These tests were carried out under conditions conducive to prolific growth of the organisms. Under conditions of normal food storage, the test compounds would be effective at even lower levels. Potassium sorbate was inhibitory in this test only at 2 percent or above under the test conditions and calcium propionate did not inhibit growth even at the 2 percent level. Salmonellae are important public health organisms frequently found in foods, especially meat, eggs, and dairy products. All members of the genus are considered as human pathogens.

The present additives are also very effective with respect to mold inhibition which is shown in the following Table IV.

TABLE IV.—ACTION AGAINST FUNGI

| Compound | Minimum inhibitory concentration (percent) against— | | | | | | |
|---|---|---|---|---|---|---|---|
| | Trichoderma 12688 [1] | Botrytis 9435 [1] | P. roquefortii 6988 [1] | Fusarium 10911 [1] | B. fulva | A. niger | A. Flavus |
| 1,3-pentanediol | + | + | 2 | + | + | + | + |
| 1,3-heptanediol | 1 | 1 | 0.2 | 1 | 0.2 | 0.2 | 1 |
| 1,3-pentanediol-monopropionate | O | O | 1 | O | O | 1 | O |
| 1,3-octanediol-monopropionate | 0.2 | 0.2 | 0.2 | 0.2 | 0.2 | 0.2 | 0.2 |
| 1,3-butanediol-dipropionate | 0.2 | 0.2 | 0.2 | 1 | 0.2 | 0.2 | 0.2 |
| 1,3-butanediol-monooctanoate | O | O | 0.2 | O | O | 0.2 | O |
| 1,3-pentanediol-monooctanoate | O | O | 1 | O | O | 0.2 | O |
| Potassium sorbate | 2 | 0.2 | 0.2 | 2 | 2 | 2 | 2 |
| Calcium propionate | + | 1 | 0.2 | + | + | + | + |

NOTE.—Symbols: +=No effect at 2%. The lowest level tested in this experiment was 0.2%. O=Not tested.
[1] All microorganism numbers, American Type Culture Collection.

In Table V some selected diols and esters are compared with potassium sorbate and calcium propionate, TABLE V.—MINIMUM INHIBITORY CONCENTRATION (PERCENT) AGAINST *ASPERGILLUS NIGER* UNDER SPECIFIED CONDITIONS

[pH 6.8]

| | Nutrient broth | Dextrose added, wt. percent— | | | Glycerol added, wt. percent— | | |
|---|---|---|---|---|---|---|---|
| | | 5 | 10 | 20 | 5 | 10 | 20 |
| Potassium sorbate | X | X | X | X | X | X | X |
| Propylene glycol | X | X | X | X | X | X | X |
| 1,3-butanediol | XX | XX | XX | XX | XX | XX | XX |
| Calcium propionate | X | X | X | X | X | X | X |
| 1,3-heptanediol | 0.1 { | >0.5 <1.0 | >0.2 <0.5 | >0.5 <1.0 | >0.2 <0.5 | >0.2 <0.5 | >0.5 <1.0 |
| 1,3-butanediol-monooctanoate | 0.05 | 0.05 | 0.05 | 0.05 | 0.05 | 0.05 | 0.05 |
| 1,3-octanediol-monopropionate | 0.05 | 0.05 | 0.05 | 0.05 { | >0.05 <0.1 } | 0.05 | 0.05 |
| 1,3-nonanediol | 0.05 | O | O | O | O | O | O |
| Potassium sorbate | >1.0 <2.0 | X | X | X | X | X | >0.2 <1.0 |
| Calcium propionate | X | X | X | X | X | X | X |
| 1,3-heptanediol | 0.1 | >0.2 <0.5 | >0.2 <0.5 | >0.2 <0.5 | >0.2 <0.5 | >0.2 <0.5 | >0.2 <.5 |
| 1,3-butanediol-monooctanoate | 0.1 | 0.1 | 0.1 | 0.1 | 0.1 | 0.1 | 0.1 |
| 1,3-octanediol-monopropionate | 0.1 | 0.1 | 0.1 | 0.1 | 0.1 | 0.1 | 0.1 |

NOTE.—X=Not effective at the highest level tested: 2%. XX=Not effective at the highest level tested: 5%. O=Not tested.

commercial mold inhibitors, in effectiveness against various common molds. The lower the "minimum" effective concentration, the more effective the compound. It is apparent that several of the test compounds are significantly better than the currently used preservatives.

TABLE III.—ACTION AGAINST BACTERIA

| Compound | Minimum inhibitory concentration (percent) against— | | |
|---|---|---|---|
| | P. aeruginosa | Salmonella typhimurium | E. coli |
| 1,3-heptanediol | 1 | 0.5 | 1 |
| 1,3-nonanediol | 0.5 | 0.2 | O |
| 1,3-octanediol-1-monopropionate | O | 0.2 | 2 |
| 1,3-butanedioldipropionate | O | 0.2 | 1 |
| Potassium sorbate | + | 2 | + |
| Calcium propionate | + | + | + |

NOTE.—Symbols: +=No effect at 2%. O=not tested.

EXAMPLE 2

In addition to these tests, some more definitive studies were conducted to determine the effectiveness of certain diols and esters in inhibiting the growth of two common molds under various culture conditions. These tests were carried out as described above except that the pH was varied by the use of suitable buffering agents and, in some experiments, either dextrose or glycerol were added to demonstrate the effectiveness of the diols and esters in different growth media.

For purposes of comparison, several commercial preservatives were tested under the same conditions. The results are shown in Tables V and VI. It is apparent from these data that the 1,3-diols and esters are significantly more effective than the commercial additives. Of especial importance is the finding (Tables V and VI) that 1,3-heptanediol and the esters are highly active inhibitors of molds, typified by *A. niger* and *P. roquefortii* at a pH of 6.8 (nearly neutral) where commercial additives are either only slightly effective or ineffective. It is also noteworthy that neither propylene glycol nor 1,3-butanediol were effective. This is very important for the preservation of grains where the pH of the preparation must be near neutrality.

It is apparent from the results of the nutritional and microbiological studies described above that 1,3-diols of six carbon atoms or more and some of their esters are safe and effective antimicrobial preservatives.

TABLE VI.—MINIMUM INHIBITORY CONCENTRATION (PERCENT) AGAINST *PENICILLIUM ROQUEFORTII* UNDER SPECIFIED CONDITIONS

[pH 6.8]

| | Nutrient broth | Dextrose added, wt. percent | | | Glycerol added, wt. percent | | |
|---|---|---|---|---|---|---|---|
| | | 5 | 10 | 20 | 5 | 10 | 20 |
| Potassium sorbate | >0.2 | >0.2 | >0.2 | >0.2 | >0.2 | >0.2 | >0.2 |
| Calcium propionate | <1.0 | <1.0 | <1.0 | <1.0 | <1.0 | <1.0 | <1.0 |
| | XX | XX | XX | XX | XX | XX | XX |
| 1,3-heptanediol | 0.05 { | >0.2 | >0.2 | >0.2 | >0.2 | >0.2 | >0.2 |
| | | <0.5 | <0.5 | <0.5 | <0.5 | <0.5 | <0.5 |
| 1,3-butanediol-monooctanoate | 0.05 | 0.05 | 0.05 | 0.05 | 0.05 | 0.05 | 0.05 |
| 1,3-octanediol-monopropionate | 0.05 | 0.05 | 0.05 | 0.05 | 0.05 | 0.05 | 0.05 |

[pH 5.2]

| | | | | | | | |
|---|---|---|---|---|---|---|---|
| Potassium sorbate | >0.2 | >0.2 | >0.2 | >0.2 | >0.2 | >0.2 | >0.2 |
| Calcium propionate | <1.0 | <1.0 | <1.0 | <1.0 | <1.0 | <1.0 | <1.0 |
| | XX | XX | XX | XX | XX | XX | XX |
| 1,3-heptanediol | 0.1 { | >0.2 | >0.2 | >0.2 | >0.2 | >0.2 | >0.2 |
| | | <0.5 | <0.5 | <0.5 | <0.5 | <0.5 | <0.5 |
| 1,3-butanediol-monooctanoate | 0.1 | 0.1 | 0.1 | 0.1 | 0.1 | 0.1 | 0.1 |
| 1,3-octanediol-monopropionate | 0.1 | 0.1 | 0.1 | 0.1 | 0.1 | 0.1 | 0.1 |

NOTE.—XX=Not effective at the highest level tested: 2%.

The diols and/or diol esters of the present invention are particularly desirable for use in feed compositions such as chicken feed compositions. A suitable feed mash is listed in Table VII and a composition in Table VIII. The diols and/or diol esters are included in the feed at a level of 0.1 to 0.5 percent, that is, 2 to 5 pounds per ton.

TABLE VII.—FORMULA 1a—ALL MASH STARTING FEED

| Ingredient | Pounds per 100 pounds | Pounds per ton |
|---|---|---|
| Ground yellow corn | 25.00 | 500 |
| Pulverized oats | 15.00 | 300 |
| Wheat middlings, standard | 15.00 | 300 |
| Soybean meal | 12.50 | 250 |
| Corn gluten meal | 9.75 | 195 |
| Fish meal | 8.50 | 170 |
| Dried skim milk | 2.50 | 50 |
| Dehydrated alfalfa meal | 7.50 | 150 |
| Dried distillers' solubles | 2.50 | 50 |
| Mineral mixture No. 1 | 1.30 | 26 |
| Salt | 0.30 | 6 |
| Feeding oil (1,000 A, 400 D) | 0.15 | 3 |
| Total | 100.00 | 2,000 |

EXAMPLE 3

Evaluation of 1,3-Diols as Preservatives for Poultry Feeds

PROCEDURE

To 100 g batches of FCA Chick Starter (see Formula 1a) were added 5 ml of water and various amounts of the additives shown below. The batches were then stored at room temperature for 72 hours and evaluated for mold growth on a scale from 1–5:

5 = Heavy mold growth.
4 = Moderate mold growth.
3 = Light growth.
2 Slight to questionable growth.
1 No growth.

RESULTS

| Batch | Additive | Percent | Mold Score |
|---|---|---|---|
| 1 | None (control) | | 5 |
| 2 | 1,3-Heptanediol | 0.50 | 3 |
| 3 | 1,3-Heptanediol | 0.75 | 2 |
| 4 | 1,3-Heptanediol | 1.00 | 1 |

Thus, the present invention is concerned with feed and feed compositions which have excellent resistance to attack by molds, bacteria and yeast which contain as an ingredient thereof a 1,3-diol and/or ester as defined heretofore.

TABLE VIII

CALCULATED COMPOSITION

| | Percent |
|---|---|
| Protein (N × 6.25) | 23.0 |
| Arginine | 1.15 |
| Lysine | 1.01 |
| Methionine | 0.51 |
| Cystine | 0.31 |
| Tryptophane | 0.23 |
| Glycine | more than 1.4 |
| Isoleucine | 1.16 |
| Leucine | 2.31 |
| Phenylalanine | 1.14 |
| Threonine | 0.86 |
| Valine | 1.18 |
| Histidine | 0.55 |
| Tyrosine | 0.85 |
| Fat (ether extract) | 4.3 |
| Crude fiber | 6.5 |
| Calcium | 1.16 |
| Phosphorus | 0.73 |
| Total salt (NaCl) | 0.59 |
| Potassium | 0.85 |
| Magnesium | 0.23 |
| | Parts per Million |
| Manganese | 62 |
| Iodine | 6[1] |
| Iron | more than 80 |
| Vitamin A | units per pound[2] |
| | 6000–9000 |
| Vitamin D | A.O.A.C. (chick units per pound) |
| | 270 |
| | Milligrams per Pound |
| Vitamin E | 20 |
| Riboflavin | 1.8 |
| Pantothenic acid | 5.9 |
| Choline | 660 |
| Niacin | 21 |
| Thiamine | 2.6 |

[1] 5.85 PPM is supplied by Mineral Mixture No. 1; only about 0.15 to 0.20 PPM is supplied by the other ingredients.
[2] Depends chiefly on the carotene content of the alfalfa meal.

The effectiveness of the diols of the present invention is illustrated in the following example.

What is claimed is:

1. Raw grain composition comprising raw grain having admixed therewith from 0.05 to 2.0 percent by weight based on the weight of grain present of an aliphatic 1,3-diol or an ester thereof, said diol characterized by having from three to 15 carbon atoms in the aliphatic chain and said ester having from two to 15 carbon atoms in the acyl portion of the molecule.

2. Composition as defined by claim 1 wherein said diol is selected from the group consisting of 1,3-octanediol, 1,3-heptanediol and 1,3-nonanediol.

3. Composition as defined by claim 1 wherein said diol ester is selected from the group consisting of 1,3-butanediol-1-monooctanoate and 1,3-octanediol-1-monopropionate.

4. Composition as defined by claim 1 wherein the amount of diol or diol ester present is in the range from about 0.1 to 0.5 percent by weight based upon the weight of the grain.

5. Composition as defined by claim 1 wherein said raw grain comprises wheat particles.

6. Composition as defined by claim 1 wherein said raw grain comprises oats.

7. Composition as defined by claim 1 wherein said raw grain comprises rye.

8. Composition as defined by claim 1 wherein said raw grain comprises beans.

9. Composition as defined by claim 1 wherein said raw grain comprises maize.

10. Composition as defined by claim 1 wherein said raw grain comprises hay.

11. Composition as defined by claim 1 wherein said raw grain comprises rice.

* * * * *

UNITED STATES PATENT OFFICE
CERTIFICATE OF CORRECTION

Patent No. 3,773,518     Dated November 20, 1973

Inventor(s) John W. Frankenfeld, Raam R. Mohan and Robert L. Squibb

It is certified that error appears in the above-identified patent and that said Letters Patent are hereby corrected as shown below:

-- Assignee: Esso Research and Engineering Company,

Signed and sealed this 8th day of October 1974.

(SEAL)
Attest:

McCOY M. GIBSON JR.
Attesting Officer

C. MARSHALL DANN
Commissioner of Patents